United States Patent [19]

Lessard et al.

[11] Patent Number: 4,679,401
[45] Date of Patent: Jul. 14, 1987

[54] TEMPERATURE CONTROL OF CRYOGENIC SYSTEMS

[75] Inventors: Philip A. Lessard, Acton; Allen J. Bartlett, Milford; John F. Peterson, Lynnfield, all of Mass.

[73] Assignee: Helix Technology Corporation, Waltham, Mass.

[21] Appl. No.: 752,354

[22] Filed: Jul. 3, 1985

[51] Int. Cl.⁴ .............................. B01D 8/00
[52] U.S. Cl. ........................ 62/55.5; 55/269; 62/100; 62/268; 417/901
[58] Field of Search .............. 62/6, 278, 55.5, 268, 62/100; 55/269; 417/901

[56] References Cited

U.S. PATENT DOCUMENTS

| | | | |
|---|---|---|---|
| 3,537,274 | 11/1970 | Tilney | 62/278 |
| 3,585,807 | 6/1971 | Hengevoss | 62/55.5 |
| 4,277,949 | 7/1981 | Longsworth | 62/54 |
| 4,310,337 | 1/1982 | Sarcia | 62/55.5 |
| 4,339,927 | 7/1982 | Sarcia | 62/55.5 |
| 4,438,632 | 3/1984 | Lessard et al. | 62/55.5 |
| 4,485,631 | 12/1984 | Winkler | 62/55.5 |
| 4,506,513 | 3/1985 | Max | 62/278 |
| 4,535,597 | 8/1985 | Missimer et al. | 62/55.5 |

FOREIGN PATENT DOCUMENTS 2065782A 7/1981 United Kingdom .

OTHER PUBLICATIONS

R. A. Byrns and G. A. Newell, "Cryopump Operations with the Tokamak Neutral Beam Injector Prototype", pp. 1145-1152.
John F. Peterson and Hans A. Steinherz, "Vacuum Pump Technology; A Short Course on Theory and Operations", Solid State Technology, pp. 104-110, Jan. 1982.
Peter H. Singker, "Update on Cryogenic Pumps", Semiconductor International, pp. 89-99, Oct. 1982.
R. C. Longsworth and G. E. Bonney, "Cryopump Regeneration Studies", J. Vac. Sci Technol, vol. 21, No. 4, pp. 1022-1027, Nov./Dec. 1982.

Primary Examiner—Ronald C. Capossela
Attorney, Agent, or Firm—Hamilton, Brook, Smith & Reynolds

[57] ABSTRACT

To control the temperature of one or more heat sinks of a cryogenic refrigerator in a cryopump, refrigerant gas to the refrigerator is diverted through heat exchangers associated with the refrigerator heat sinks. The diverted refrigerant gas may be used to maintain the temperature of the first stage cryopumping surfaces above some level to avoid cross over hangup. The second stage cryopumping surfaces may be warmed by the diverted refrigerant to some temperature level for partial regeneration. Both heat sinks may be warmed for full regeneration of the cryopump. Bleed flow of refrigerant gas cooled by the first stage of the refrigerator can be directed past a thermal mass to cool that mass. By reversing the flow of refrigerant gas during cooldown of the system, the thermal mass can be used to more rapidly cool the refrigerator. The thermal mass is thermally isolated from the refrigerator heat sinks and is positioned within the vacuum vessel of the cryopump adjacent to the first stage of the refrigerator.

30 Claims, 3 Drawing Figures

TEMPERATURE CONTROL OF CRYOGENIC SYSTEMS

DESCRIPTION

Background

Cryopumps currently available, whether cooled by open or closed cycle cryogenic refrigerators, generally follow the same design concept. A low temperature second stage array, usually operating in the range of 4 to 25K., is the primary pumping surface. This surface is surrounded by a higher temperature cylinder, usually operated in the temperature range of 70 to 130K., which provides radiation shielding to the lower temperature array. The radiation shield generally comprises a housing which is closed except at a frontal array positioned between the primary pumping surface and the chamber to be evacuated. This higher temperature, first stage, frontal array serves as a pumping site for higher boiling point gases such as water vapor.

In operation, high boiling point gases such as water vapor are condensed on the frontal array. Lower boiling point gases pass through that array and into the volume within the radiation shield and condense on the second stage array. A surface coated with an adsorbent such as charcoal or a molecular sieve operating at or below the temperature of the second stage array may also be provided in this volume to remove the very low boiling point gases. With the gases thus condensed and or adsorbed onto the pumping surfaces, only a vacuum remains in the work chamber.

In systems cooled by closed cycle coolers, the cooler is typically a two stage refrigerator having a cold finger which extends through the rear of the radiation shield. The cold end of the second, coldest stage of the cryocooler is at the tip of the cold finger. The primary pumping surface, or cryopanel, is connected to a heat sink at the coldest end of the second stage of the coldfinger. This cryopanel may be a simple metal plate or cup or an array of metal baffles arranged around and connected to the second stage heat sink. This second stage cryopanel also supports the low temperature adsorbent.

The radiation shield is connected to a heat sink, or heat station at the coldest end of the first stage of the refrigerator. The shield surrounds the first stage cryopanel in such a way as to protect it from radiant heat. The frontal array is cooled by conduction to the first stage heat sink through the side shield or, as disclosed in U.S. Pat. No. 4,356,701, through thermal struts.

Once the high vacuum has been established, work pieces may be moved into and out of the work chamber through partially evacuated load locks. With each opening of the work chamber to the load lock, additional gases enter the work chamber. Those gases are then condensed onto the cryopanels to again evacuate the chamber and provide the necessary low pressures for processing. Process gas may also condense onto the cryopanels. After several days or weeks of use, the gases which have condensed onto the cryopanels and, in particular, the gases which are adsorbed begin to saturate the system. A regeneration procedure must then be followed to warm the cryopump and thus release the gases and to remove the gases from the system.

To flush the released gases from the system, an inert gas such as nitrogen is often introduced into the cryopump chamber. To lessen the time required for warmup during regeneration, that gas is often warmed before it is introduced into the cryopump chamber.

The first stage to saturate is generally the second stage of the system. In some systems, a partial regeneration procedure is followed between full regeneration procedures. In the partial regeneration procedure only the second stage is warmed to a temperature less than about 30K. to release the adsorbed gases of the second stage. The second stage temperature must be held below about 30K. to avoid release of gases frozen on the second stage which would contaminate the adsorbent and ruin the vacuum. The first stage is also held to a temperature of less than 130K. to avoid release of any gases from that stage.

Closed cycle refrigerators present a particular difficulty in implementing partial regeneration. Both stages operate from the same supply of pressurized refrigerant and are mechanically coupled together. It is difficult to modify operation of the refrigerator to warm the second stage without excessively warming the first stage. Several approaches have been suggested to overcome this problem. One approach is to load the second stage as with an electric heater or, as in U.S. Pat. No. 4,438,632, with a heat conducting rod. Other approaches are to block refrigerant gas from the second stage or cause the refrigerant gas to bypass the thermal regenerator of the second stage during partial regeneration as in U.S. Pat. No. 4,485,631.

Another temperature control problem associated with cryopumps cooled by closed cycle refrigerators is that of cross over hangup. Cross over is the processing step in which a valve between the work chamber and cryopump is opened to expose the very high vacuum cryopump to a lower vacuum work chamber. Cross over hangup results when the first stage becomes too cold and thus temporarily condenses gases which are intended to be condensed on the second stage. The refrigerator is usually operated at its maximum cooling potential in order to maintain as low a temperature in the second stage as possible. The temperature of the first stage then becomes dependent on thermal loads, and with low load situations the first stage can become too cold. One approach to overcoming the problem of crossover hangup, set forth in U.S. patent application Ser. No. 684,967, filed Dec. 20, 1984, is to load the first stage by thermal radiation adsorbed by a blackened radiation shield.

DISCLOSURE OF THE INVENTION

The present invention can be applied to a cryogenic refrigerator comprising a source of refrigerant gas under pressure and gas expansion means for expanding refrigerant gas to cool a refrigerator heat sink to cryogenic temperatures. In accordance with the present invention, the refrigerator is provided with means to selectively divert refrigerant gas away from the gas expansion means. A heat exchanger in thermal communication with the refrigerator heat sink receives the diverted refrigerant gas and conducts heat from the refrigerant gas into the refrigerator heat sink to warm the heat sink.

Preferably, a temperature sensor is provided to sense the temperature of the heat sink and the flow of diverted refrigerant gas is controlled to maintain the temperature of the heat sink at a predetermined level. The refrigerant gas flow is best controlled by a proportional flow control valve.

A thermal mass isolated from the refrigerator heat sink may be provided. Refrigerant gas cooled by the heat sink may be directed past the thermal mass to cool the thermal mass. Thereafter, to again cool the refrigerator during start up, diverted refrigerant gas may be cooled by the thermal mass and then directed past the refrigerator heat sink to again cool the heat sink. To expedite warming of the refrigerator, the diverted refrigerant gas may be heated by a heater.

When the invention is applied to a cryopump cooled by a closed cycle refrigerator, the temperature of the first stage may be sensed and by flow control of diverted refrigerant may be maintained at a level greater than that necessary to avoid crossover hangup. The diverted flow may be directed past heat sinks of both the first and second stages of the refrigerator in a full regeneration procedure or may be directed solely past the second stage heat sink for partial regeneration. In partial regeneration, the refrigerant gas flow can be controlled to maintain a temperature of less than 30K.

BRIEF DESCRIPTION OF DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENTS OF THE INVENTION

Figure 1:
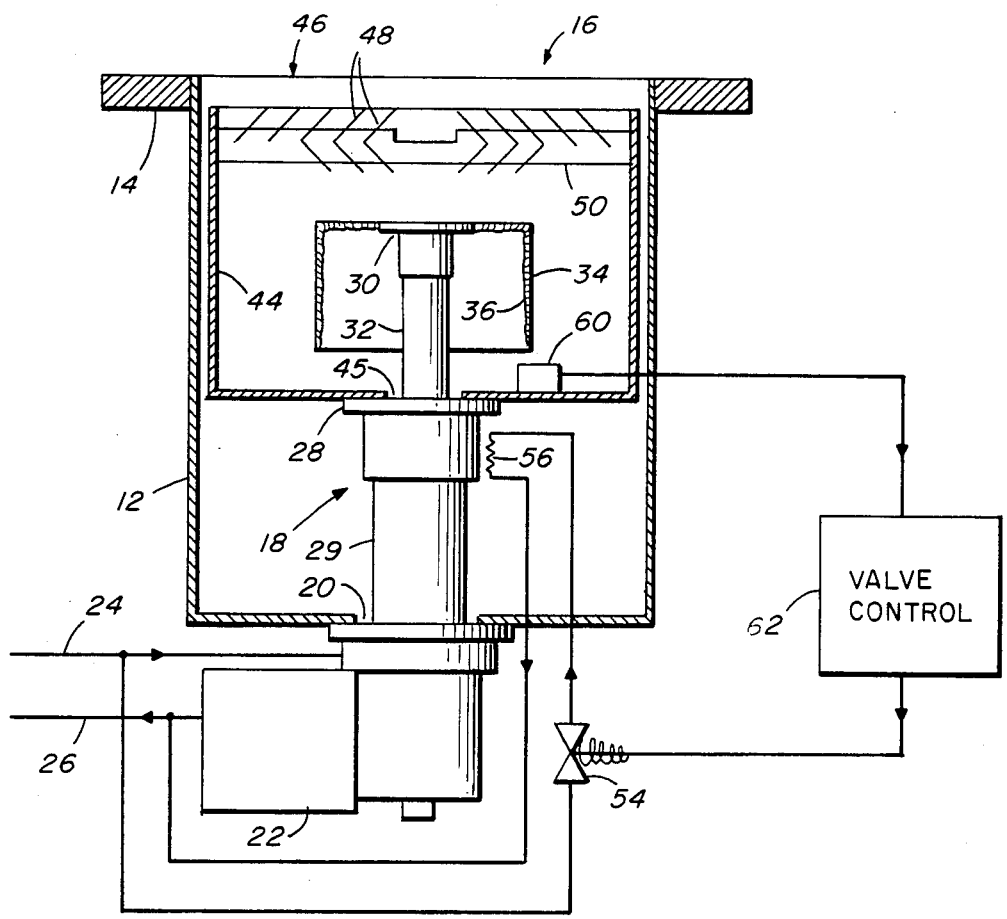
FIG. 1 is a schematic illustration of one embodiment of the present invention suited to the prevention of a cross over hangup of a cryopump.

The cryopump of each of the figures comprises a vacuum vessel 12 which is mounted to the wall of a work chamber along a flange 14. A front opening 16 in the vessel 12 communicates with a circular opening in a work chamber. Alternatively, the cryopump assembly may protrude into the chamber and a vacuum seal be made at a rear flange. A two stage cold finger 18 of a refrigerator protrudes into the vessel 12 through an opening 20. In this case, the refrigerator is a Gifford-MacMahon refrigerator such as disclosed in U.S. Pat. No. 3,218,815 to Chellis et al., but others may be used. A two stage displacer in the cold finger 18 is driven by a motor 22. With each cycle, helium gas introduced into the cold finger under pressure through line 24 is expanded and thus cooled and then exhausted through line 26. A first stage heat sink, or heat station, 28 is mounted at the cold end of the first stage 29 of the refrigerator. Similarly, a heat sink 30 is mounted to the cold end of the second stage 32.

The primary pumping surface is, in this system, an inverted cup 34 mounted to the heat sink 30. A low temperature adsorbent 36 such as charcoal particles is epoxied to the inside surface area of the cup.

A cup shaped radiation shield 44 is mounted to the first stage, high temperature heat sink 28. The second stage of the cold finger extends through an opening 45 in that radiation shield. This radiation shield 44 surrounds the second stage array to the rear and sides to minimize heating of the array by radiation. Preferably the temperature of this radiation shield is less than about 120K.

A frontal cryopanel array 46 serves as both a radiation shield for the primary cryopanel and as a cryopumping surface for higher boiling temperature gases such as water vapor. This array comprises louvers 48 joined by spokes 50. The frontal array 46 is mounted to the radiation shield 44, and the shield both supports the frontal array and serves as the thermal path from the heat sink 28 to that array.

The cryopump of FIG. 1 is modified to overcome the problem of cross over hangup. As already noted, cross over hangup is the result of the first stage cryopumping surface, primarily the louvers 48, becoming so cold that gases intended to be condensed or adsorbed onto the second stage cryopumping surface are temporarily condensed on the first stage. The system can not be pumped down to the desired pressures until such gases evaporate from the first stage surface and become captured by the second stage. Too low temperatures of the first stage can be avoided by providing a thermal load on the first stage.

In accordance with the present invention, the thermal load to the first stage is provided without the requirement for potentially dangerous electrical heating wires in the vacuum environment and without loading of the first stage cryopumping surface at temperatures above the critical temperature at which cross over hangup is not a problem. The critical temperature is dependent on the gases in the system but is typically in the range of about 50K. -65K. To that end, a portion of the refrigerant gas from line 24 is bleed through a flow control valve 54 to a heat exchanger 56 which is in heat exchange relationship with the heat sink 28 of the first stage. There, the refrigerant gas which was initially at about room temperature provides a thermal load to the heat sink 28. The gas is returned to the low pressure line 26.

The temperature of the first stage is sensed by a temperature sensor 60 mounted to the radiation shield. The temperature signal is applied to a control circuit 62, such as a Granville-Phillips model 216 valve controller, which in turn controls the proportional flow control valve 54. As the temperature of the radiation shield 44 drops below some predetermined level the valve control unit 62 opens the valve 54 to allow a sufficient flow of diverted refrigerant gas through the heat exchanger 56 to maintain the desired temperature of the radiation shield. The flow through the valve 54 can be adjusted to allow for a steady flow of diverted refrigerant gas to maintain the predetermined temperature of the first stage for any particular load conditions. Because the temperature to which the first stage is maintained is still a very low temperature such as about 50K., the operation of the second stage of the refrigerator is not affected significantly.

Figure 2:
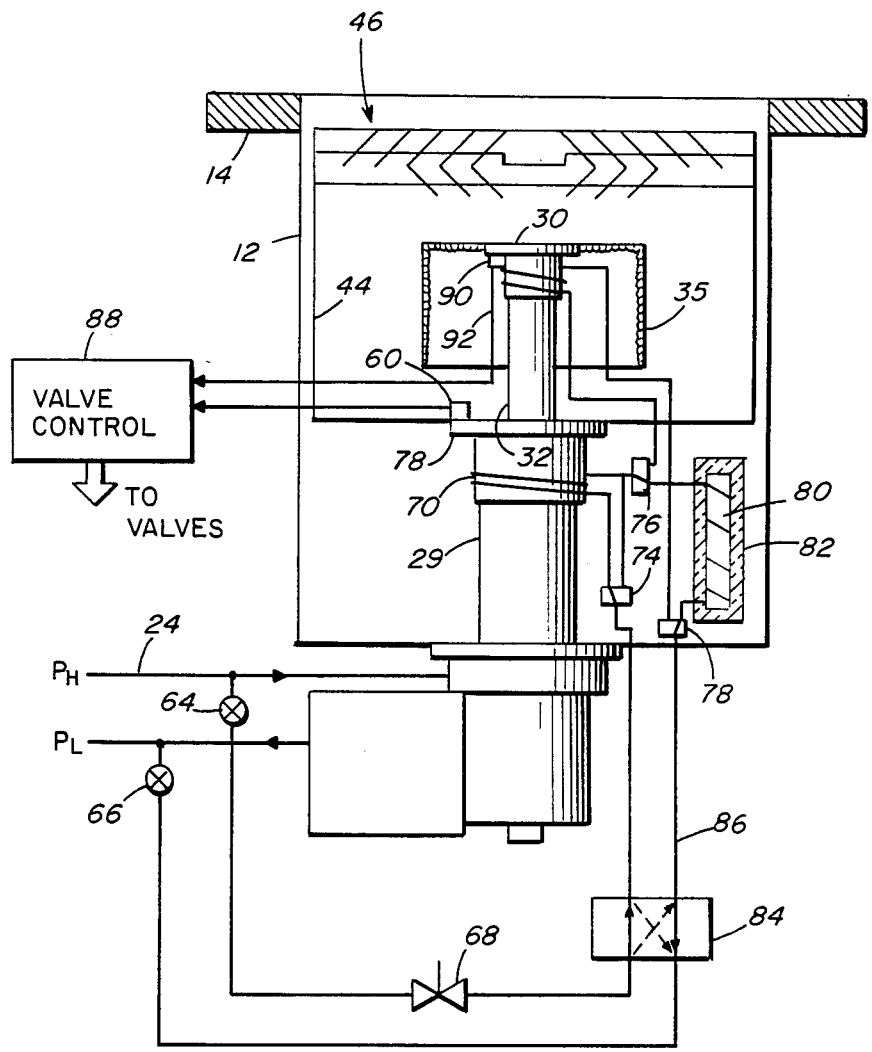
FIG. 2 is a schematic illustration of an alternative embodiment providing for multiple modes of temperature control of a cryopump.

FIG. 2 illustrates a more sophisticated embodiment of the present invention which allows for several modes of operation. In this system, the high pressure gas is diverted from the high pressure line 24 through an isolation valve 64 and the gas is ultimately returned to the low pressure line 26 through an isolation valve 66. As before, flow of the diverted refrigerant gas is controlled by a proportional flow control valve 68. The system of FIG. 2, however, allows for the refrigerant gas to be selectively brought into heat exchange relationship with either the first stage heat sink 28, the second stage heat sink 30 or both in series. To that end, the diverted refrigerant gas can be directed through either of heat exchangers 70 and 72 coiled around the heat sinks 28 and 30. The gas is directed through one or both of those heat exchangers by three-way valves 74 and 76.

In addition to being directed into heat exchange relationship with one or both of the refrigerator heat sinks, the refrigerant gas may be passed into heat exchange relationship with a thermal mass 80 by means of a valve 78. As refrigerant gas is passed through either of the heat exchangers 70 or 72, the gas is cooled and the thermal mass 80 allows that coolness to be captured for subsequent cooling of the refrigerator during startup. Thermal mass 80 is surrounded by thermal insulation 82 which isolates it from the refrigerator heat sinks. The thermal mass 80 and surrounding insulation are most conveniently positioned in the cryopump chamber 12 adjacent to the first stage 29 between the chamber 12 and the radiation shield 44. Although shown only to one side of the coldfinger, the thermal mass may be in the shape of a ring surrounding the coldfinger.

With the valves 74 and 76 positioned as shown in FIG. 2, the second stage heat exchanger 72 is bypassed. In that mode of operation, with the four-way valve 84 set to direct the diverted refrigerant gas first through the refrigerator heat exchanger 70, the system operates just as the system of FIG. 1. That is, a bleed flow of diverted gas through valve 68 is controlled by the valve controller 88, responsive to the first stage temperature sensed by the temperature sensor 60, to maintain the temperature of the first stage above a predetermined level which avoids crossover hangup. The thus cooled refrigerant gas is directed by the valve 78 to extract heat from the thermal mass 80. Over a period of, for example, three hours the bleed flow used to maintain the temperature of the first stage can cool the thermal mass 80 to about the temperature of the first stage.

For full regeneration of the cryopump the positions of the valves 76 and 78 are switched to direct relatively warm refrigerant gas past the two heat exchangers 70 and 72 and bypass the thermal mass 80. Thus, the heat sinks 28 and 30 are rapidly warmed by diverted refrigerant gas. After the regeneration process, the four way valve 84 and valve 78 are switched to direct the high pressure gas first past the thermal mass to cool the gas. The cooled gas then passes through each of the heat exchangers 72 and 70 to cool the refrigerator heat sinks. The heat sinks are thus more rapidly cooled than they would be by mere operation of the refrigerator.

Warming up a cryopump typically takes 30 to 45 minutes for full regeneration. Utilizing diverted refrigerant gas initially at about room temperature, that warming up process has been reduced to about 6 minutes. Typical cooldown time for a cryopump is about 60 minutes. Using ten pounds of copper shot as the thermal mass 80 cooled during system operation, that cooldown time has been reduced to 40 minutes. The heat sink 28 was cooled down to about 150K. by means of the diverted refrigerant gas and the remainder of the cooling was obtained solely by the closed cycle refrigerator.

The diverted gas which warms the system for regeneration is itself cooled and could be used for cooling the thermal mass. However, cooling of the thermal mass is best accomplished with a bleed flow rather than during the rapid regeneration process.

The system of FIG. 2 can also be used for partial regeneration. To that end, the valve 74 is set to bypass the heat exchanger 70 while the valves 76 and 78 direct the diverted refrigerant gas through the heat exchanger 72 alone. A second stage temperature signal is provided to the valve control 88 by a temperature sensor 90. By control of the proportional control valve 68, the flow of refrigerant gas can be maintained at a level which maintains the heat sink 30 at a temperature above the normal operating temperature of the system but below 30K. The refrigerator continues to operate at full capacity so the first stage heat sink 28 is maintained at a sufficiently low temperature.

It can be seen that the system of FIG. 2 allows for proper temperature control of the first stage during system operation, partial regeneration of only the second stage, and full regeneration of both stages. The time of the full regeneration cycle is reduced substantially from that of conventional systems due to both the more rapid warmup of the refrigerator heat sinks and the subsequent more rapid cooldown of the system. In each application, it is significant that the fluid passed through the refrigerator heat exchangers 70 and 72 is diverted refrigerant gas. The gas passed through those heat exchangers must be one which does not freeze at the very cold cryogenic temperatures of below 10K. The refrigerant gas in line 14 is a ready source of such a fluid. Diverting the refrigerant gas does not degrade the refrigerator because it is only diverted at times when the refrigerator need not operate at full capacity. Also, the gas is diverted ahead of the valves found in a typical Gifford-MacMahon refrigerator. Because there is no added hardware within the working volume of the refrigerator itself, there is no additional void volume in the refrigerator.

Figure 3:
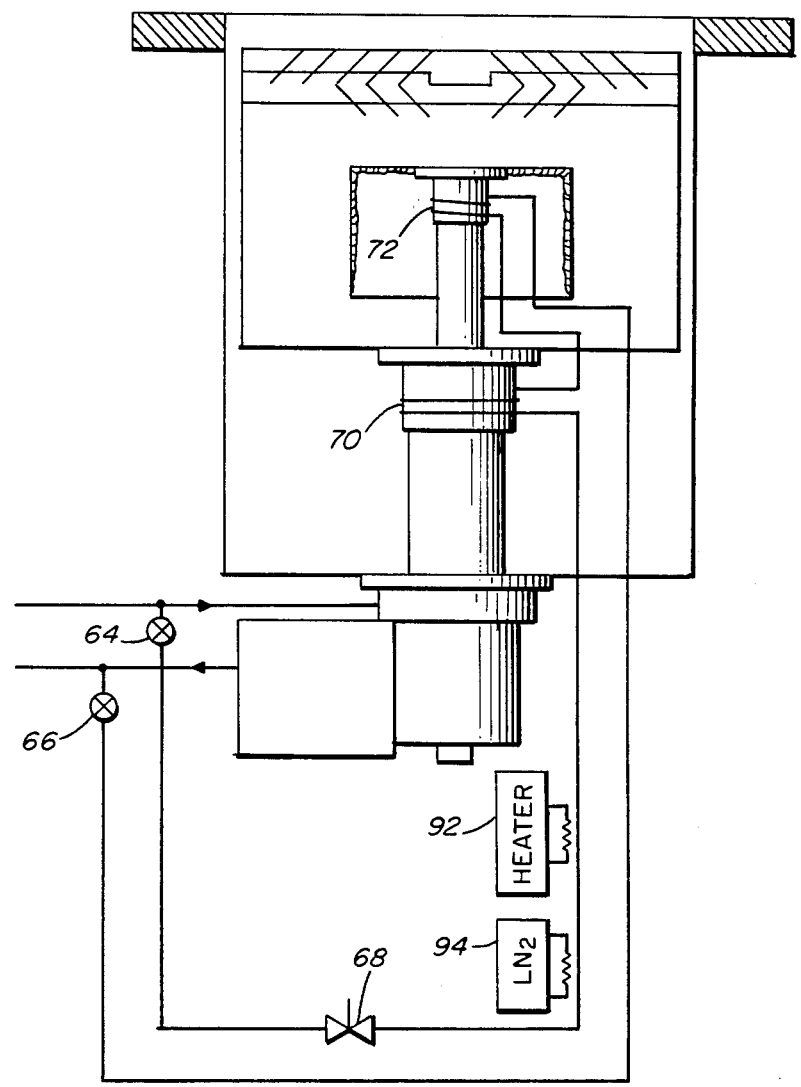
FIG. 3 is a schematic illustration of a third embodiment of the invention providing for heating and cooling of the refrigerant by external sources for full regeneration of the cryopump.

Refrigerant gas at about room temperature has been found sufficiently warm for temperature control of either the first or second stage or for full regeneration of the system. Further, the thermal mass 80 has provided a significant savings in time during cooldown of the system. However, a possible alternative for systems which require greater heat input during warmup or greater extraction of heat during cooldown is shown in FIG. 3. Again, refrigerant is diverted through an isolation valve 64 and a flow control valve 68 to heat exchangers 70 and 72 about the first and second stage heat sinks. In the system shown in FIG. 3, the heat exchangers are connected in series without the valves which allow for multiple modes of operation. It will be understood, however, that such valves can be provided. The significant additional features of FIG. 3 are the heater 92 and the liquid nitrogen cryogen source 94. The heater 92 can be used to heat the diverted refrigerant gas to temperatures in excess of room temperature for more rapid warmup of the system during regeneration. Because the heater is external to the vacuum vessel, it may be an electrical heater. To provide for more rapid cooldown of the system, the liquid nitrogen supply 94 is provided for cooling the diverted refrigerant gas. Only one of the heater or liquid nitrogen supply is in heat exchange relationship with the diverted refrigerant at any given time.

It will be recognized that the present invention is not limited to any particular cryopump configuration. In fact, the invention has application to cryogenic refrigerators other than those used to cool cryopumps. For example, the temperature of the final stage of a refrigerator might be controlled to maintain some predetermined temperature level which is within the most efficient bandwidth of a cooled electronic device, such as an infrared detector.

While the invention has been particularly shown and described with reference to preferred embodiments thereof, it will be understood by those skilled in the art that various changes in form and details may be made therein without departing from the spirit and scope of the invention as defined by the appended claims.

We claim:

1. A cryogenic refrigerator comprising:
   a refrigerator heat sink;
   a source of refrigerant gas under pressure;
   gas expansion means including a reciprocating piston in a cylinder for expanding the refrigerant gas in a gas expansion space within the cylinder to cool the gas and the refrigerator heat sink to cryogenic temperatures;
   means for selectively diverting refrigerant gas away from the gas expansion means; and
   a heat exchanger in thermal communication with the refrigerator heat sink for receiving diverted refrigerant gas and conducting heat from the refrigerant gas into the refrigerator heat sink to warm the heat sink while keeping the diverted gas out of fluid communication with the gas expansion space.

2. A cryogenic refrigerator as claimed in claim 1 further comprising means for sensing the temperature of the heat sink and means for controlling the flow of diverted refrigerant gas to maintain the temperature of the heat sink at a predetermined level.

3. A cryogenic refrigerator as claimed in claim 2 wherein the means for controlling the flow is a proportional flow control valve.

4. A cryogenic refrigerator as claimed in claim 2 further comprising a thermal mass thermally isolated from the refrigerator heat sink and means for selectively directing diverted refrigerant gas into thermal contact with the heat sink and the thermal mass in a first mode in which refrigerant gas cooled by the refrigerator heat sink cools the thermal mass or in a second mode in which refrigerant gas cooled by the thermal mass cools the heat sink.

5. A cryogenic refrigerator as claimed in claim 1 further comprising a thermal mass thermally isolated from the refrigerator heat sink and means for selectively directing diverted refrigerant gas into thermal contact with the heat sink and the thermal mass in a first mode in which refrigerant gas cooled by the refrigerator heat sink cools the thermal mass or in a second mode in which refrigerant gas cooled by the thermal mass cools the heat sink.

6. A cryogenic refrigerator as claimed in claim 1 further comprising a heater for heating diverted refrigerant gas before the refrigerant gas is brought into thermal contact with the refrigerator heat sink.

7. A cryopump comprising a source of high pressure refrigerant gas, a cryogenic refrigerator having first and second stages comprising a reciprocating piston within a cylinder for expanding and thus cooling the refrigerant gas in an expansion space within the cylinder, a first stage cryopumping surface cooled by the first stage, and a second stae cryopumping surface cooled by the second stage, the improvement comprising:
   a heat exchanger in thermal contact with a cryopumping surface; and
   means for diverting high pressure refrigerant gas away from the cryogenic refrigerator to the heat exchanger to warm the cryopumping surface while keeping the diverted gas out of fluid communication with the expansion space.

8. A cryopump as claimed in claim 7 further comprising means for sensing a temperature of the cryopumping surface in thermal contact with the heat exchanger and means for controlling the flow of diverted refrigerant gas to maintain the temperature at a predetermined level.

9. A cryopump as claimed in claim 8 wherein the heat exchanger is in thermal contact with the first stage cryopumping surface and the temperature of the cryopumping surface is maintained at a temperature greater than about 50K. which prevents crossover hangup of the cryopump.

10. A cryopump as claimed in claim 8 wherein the heat exchanger is in thermal contact with the second stage cryopumping surface and the temperature of the second stage cryopumping surface is controlled during a regeneration procedure to raise the temperature to a predetermined level less than 30K.

11. A cryopump as claimed in claim 10 further comprising a heat exchanger in thermal contact with the first stage cryopumping surface and the temperature of the first stage cryopumping surface is maintained at a temperature greater than 50K. to prevent crossover hangup of the cryopump.

12. A cryopump as claimed in claim 8 further comprising a thermal mass thermally isolated from the cryopumping surface and means for selectively directing diverted refrigerant gas into thermal contact with the cryopumping surface and the thermal mass in a first mode in which refrigerant gas cooled by the cryopumping surface cools the thermal mass or in a second mode in which refrigerant gas cooled by the thermal mass cools the cryopumping surface.

13. A cryopump as claimed in claim 7 further comprising a thermal mass thermally isolated from the cryopumping surface and means for selectively directing diverted refrigerant gas into thermal contact with the cryopumping surface and the thermal mass in a first mode in which refrigerant gas cooled by the cryopumping surface cools the thermal mass or in a second mode in which refrigerant gas cooled by the thermal mass cools the cryopumping surface.

14. A cryopump as claimed in claim 13 further comprising a radiation shield cooled by the first stage and a vacuum vessel surrounding the radiation shield and wherein the thermal mass is positioned alongside the first stage between the radiation shield and the vacuum vessel.

15. A cryopump as claimed in claim 13 comprising separate heat exchangers associated with each of the first and second stage cryopumping surfaces and means for diverting refrigerant gas through either both of the heat exchangers or only a single selected heat exchanger.

16. A cryopump as claimed in claim 15 comprising means for directing diverted refrigerant gas selectively through either heat exchanger.

17. A cryopump as claimed in claim 7 comprising separate heat exchangers associated with each of the first and second stage cryopumping surfaces and means for diverting refrigerant gas through either both of the heat exchangers or only a single selected heat exchanger.

18. A cryopump as claimed in claim 17 comprising means for directing diverted refrigerant gas selectively through either heat exchanger.

19. A cryopump as claimed in claim 7 further comprising a heater for heating diverted refrigerant gas before the refrigerant gas is brought into thermal contact with the cryopumping surface.

20. A method of controlling the temperature of a heat sink cooled by a closed cycle cryogenic refrigerator of the type comprising a reciprocating piston within a cylinder for expanding and thus cooling refrigerant gas in an expansion space, the method comprising sensing the temperature of the heat sink and, responsive to the temperature, diverting refrigerant gas from the closed cycle refrigerator through a heat exchanger in heat exchange relationship with the heat sink while keeping the diverted gas out of fluid communication with the gas expansion space.

21. A method for warming and subsequently cooling a closed cycle cryogenic refrigerator of the type comprising a reciprocating piston within a cold finger for expanding and thus cooling refrigerant gas in an expansion space, the method comprising diverting refrigerant gas from the cyrogenic refrigerator through a heat exchanger in heat exchange relationship with the heat sink to cool the refrigerant gas and warm the heat sink and passing the cooled refrigerant gas through a heat exchanger in heat exchange relationship witha thermal mass thermally isolated from the heat sink to cool the thermal mass, and subsequently cooling the heat sink of the refrigerator by directing refrigerant gas diverted from the cryogenic refrigerator past the thermal mass to cool the refrigerant gas and then past the refrigerator heat sink.

22. A method of selectively controlling the temperature of a cryopumping surface cooled by a close cycle cryogenic refrigerator in which pressurized refrigerant gas is expanded and thus cooled in an expansion space by a reciprocating piston, the method comprising sensing the temperature of the cryopumping surface and, responsive to the sensed temperature, diverting refrigerant gas from the cryogenic refrigerator into heat exchange relationship with the cryopumping surface to warm the cryopumping surface while keeping the diverted gas out of fluid communication with the expansion space.

23. A method as claimed in claim 22 wherein the cryopump comprises a first cryopumping surface cooled by a first stage of the cryogenic refrigerator and a second cryopumping surface cooled by a second stage of the cryogenic refrigerator and wherein the heat exchanger is in heat exchange relationship with the first stage cryopumping surface and the temperature of the first stage cryopumping surface is warmed to a predetermined level greater than 50K. to prevent crossover hangup.

24. A method as claimed in claim 23 wherein the cryopump comprises a second heat exchanger in heat exchange relationship with the second stage cryopumping surface and the temperature of the second stage cryopumping surface is warmed to a temperature less than 30K. during a regeneration procedure.

25. A method as claimed in claim 22 wherein the cryopump comprises a first cryopumping surface cooled by a first stage of the cryogenic refrigerator and a second cryopumping surface cooled by a second stage of the cryogenic refrigerator and wherein the heat exchanger is in heat exchange relationship with the second stage cryopumping surface and the temperature of the second stage cryopumping surface is warmed to a temperature less than 30K. during a regeneration procedure.

26. A method as claimed in claim 22 further comprising providing a thermal mass thermally isolated from the cryopumping surface, cooling the thermal mass with refrigerant gas cooled by the cryopumping surface and thereafter cooling the cryopumping surface with diverted refrigerant gas cooled by the thermal mass.

27. A method of regenerating a cryopump comprising a cryopumping surface cooled by a closed cycle cryogenic refrigerator of the type comprising a reciprocating piston within a cylinder for expanding and thus cooling refrigerant gas in an expansion space, the method comprising diverting refrigerant gas from the cryogenic refrigerator into heat exchange relationship with the cryopumping surface to warm the cryopumping surface while keeping the diverted gas out of fluid communication with the gas expansion space.

28. A method as claimed in claim 27 of regenerating a cryopump comprising first and second stage cryopumping surfaces cooled by first and second stages of a closed cycle cryogenic refrigerator, the method comprising:

in a partial regeneration mode, diverting refrigerant gas from the closed cycle cryogenic refrigerator into thermal contact with only the second stage cryopumping surface to warm the second stage cryopumping surface to a temperature less than 30K. for partial regeneration of the cryopump; and in a full regeneration mode, diverting refrigerant gas from the cryogenic refrigerator and directing the refrigerant gas into thermal contact with both the first and second cryopumping surfaces to warm both cryopumping surfaces to a substantially higher temperature.

29. A method as claimed in claim 27 comprising diverting refrigerant gas into thermal contact with only the second stage cryopumping surface to warm the second stage cryopumping surface to a temperature less than 30K. for partial regeneration of the cryopump.

30. A method as claimed in claim 27 further comprising providing a thermal mass thermally isolated from the cryopumping surface, cooling the thermal mass with refrigerant gas cooled by the cryopumping surface and thereafter cooling the cryopumping surface with diverted refrigerant gas cooled by the thermal mass.

* * * * *